# (12) United States Patent
Hutson

(10) Patent No.: US 7,545,896 B2
(45) Date of Patent: Jun. 9, 2009

(54) ASYNCHRONOUS MULTI-CLOCK SYSTEM

(75) Inventor: Matthew Peter Hutson, Bristol (GB)

(73) Assignee: STMicroelectronics Limited, Bristol (GB)

( * ) Notice: Subject to any disclaimer, the term of this patent is extended or adjusted under 35 U.S.C. 154(b) by 618 days.

(21) Appl. No.: 11/137,105

(22) Filed: May 24, 2005

(65) Prior Publication Data
US 2005/0280455 A1 Dec. 22, 2005

(30) Foreign Application Priority Data
May 24, 2004 (EP) .................................. 04253042

(51) Int. Cl.
H04L 7/00 (2006.01)
(52) U.S. Cl. .................... 375/354; 712/27; 713/400; 713/600; 710/29; 327/144
(58) Field of Classification Search ................. 375/354; 712/27; 713/400, 600; 710/29; 327/144
See application file for complete search history.

(56) References Cited

U.S. PATENT DOCUMENTS

| | | | | |
|---|---|---|---|---|
| 5,256,912 A | * | 10/1993 | Rios | 327/144 |
| 5,448,715 A | * | 9/1995 | Lelm et al. | 713/600 |
| 5,754,833 A | * | 5/1998 | Singh et al. | 713/400 |
| 6,260,152 B1 | * | 7/2001 | Cole et al. | 713/400 |
| 6,370,600 B1 | * | 4/2002 | Hughes et al. | 710/29 |
| 6,493,818 B2 | * | 12/2002 | Robertson | 712/27 |
| 7,027,542 B1 | * | 4/2006 | Shihadeh | 375/354 |

FOREIGN PATENT DOCUMENTS

| | | |
|---|---|---|
| EP | 1 071 005 A2 | 1/2001 |
| WO | WO01/79987 A1 | 10/2001 |

OTHER PUBLICATIONS

Shengxian, Zhuang et al.: "An Asynchronous Wrapper with Novel Handshake Circuits for GALS Systems", 2002 International Conference on Communications, Circuits and Systems and West SINO Exposition, vol. 2, Jun. 29, 2002, pp. 1521-1525, XP010631809.
Sridhar, R.: "System On-Chip (SoC): Clocking and Synchronization Issues", 17th International Conference on VLSI Design, Jan. 5, 2004, pp. 520-527, XP010679044.

* cited by examiner

*Primary Examiner*—Sudhanshu C Pathak

(57) ABSTRACT

A system for controlling the transfer of a signal sequence in a first clock domain to a plurality of other clock domains. The system comprising: detecting circuitry for detecting receipt of the signals from the clock domains and setting an update signal when all of the signals received from the clock domains have a common state; and gating circuitry for receiving the update signal and operable, when the update signal is set, to allow a next signal in the sequence to be received at the input of the first circuitry.

20 Claims, 3 Drawing Sheets

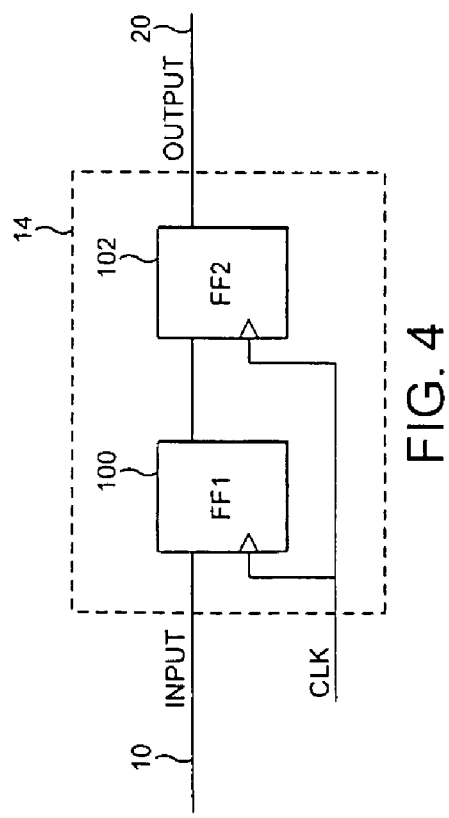

ASYNCHRONOUS MULTI-CLOCK SYSTEM

TECHNICAL FIELD OF THE INVENTION

The present invention relates to a system for controlling the transfer of a signal sequence, and in particular, but not exclusively for transferring a signal sequence in a first clock domain to a plurality of other clock domains.

BACKGROUND OF THE INVENTION

Typically, an electronic circuit is comprised of a plurality of different sub-circuits, which may be responsible for performing different functions. For example, an integrated circuit is typically constructed of a plurality of individual circuit elements. In such circuitry it is often a requirement to propagate a common signal to the different circuit elements which make up a particular electronic circuit.

In the world of digital circuit design, designers are more often required to create multi-clock designs. Multi-clock implies that a design has at least two clocks, but possibly many more clocks, that are asynchronous. Furthermore, these digital designs will include at least one, though probably multiple signals, across the boundaries between these clock environments. If these signals are not quickly synchronised then the circuit will develop errors.

If one were to consider, for example, an integrated circuit having a plurality of circuit elements, each of which having their own clock, and each having to act on a common signal, then it will be appreciated that it is necessary to adequately synchronise these circuit elements so that the integrated circuit as a whole will not develop any errors.

Systems are known for controlling the transfer of a signal, which is propagated from a first circuit element in a first clocking domain, to a second circuit element in a second clocking domain, and wherein the first and second clocking domains are asynchronous. In the past, one way of handling the asynchronous clock domains was by retiming the signal clocked into the second clock domain, and ensuring that the rate of change and the pulse width (i.e. high/low) is okay between the domains. However, this relies on knowing the rate and the pulse width and so is typically only used for regular timing reference signals. Another way of handling asynchronous clock domains in the past, was by using software to update a register held in each specific clock domain, wherein the registers being accessible via an asynchronous bridge (for example using a known "VALID/ACK" protocol).

However, it is often the case that a signal is transferred from a first clock domain to a plurality of other clock domains which are all asynchronous. In such a situation it will be appreciated that the complexity required for synchronisation is greatly increased.

A known solution to the problem of synchronising one clock domain to many clock domains is to control the timing of the common signal that is passed to the first clock domains. This is accomplished by using so-called hold-off periods, wherein a signal having for example a stream of bits, will send a particular bit and wait for a predetermined time (i.e. x seconds) before the next bit in the stream is transferred to the first clock domain. In such a system it is necessary for the circuit designer to calculate the amount of time necessary for the signal to settle in each of the plurality of clock domains before sending the next signal (i.e. bit in the stream). However, this potentially suffers from a number of disadvantages.

On one hand, if the hand-off time x is selected to be a value which is too big, then the integrated circuit does not operate optimally in that it will have a wasted time period after which all of the clock domains have settled, but during which time the next signal in the signal sequence waits and will not be transferred until the total hand-off time has elapsed. On the other hand, if the hand-off time selected is too small a value, then one or more of the domains will not have settled before the next signal is propagated through the integrated circuit, which results in the worst case scenario in that errors will be introduced into the system.

SUMMARY OF THE INVENTION

To address the above-discussed deficiencies of the prior art, it is an object of an embodiment of the present invention to control a signal to be transferred between a first clock domain to a plurality of other clock domains which overcomes the aforementioned disadvantages.

According to a first aspect of the present invention there is provided a system for controlling the transfer of a signal sequence in a first clock domain to a plurality of other clock domains, the first clock domain comprising first circuitry having an input for receiving a signal from the sequence and an output for outputting the signal in dependence on a first clock signal to the other clock domains, the signal at the output of the first circuitry having a first state, and wherein each of the other clock domains comprise circuitry for transmitting a signal representing the first state in dependence on their respective clock signals, the system comprising: detecting circuitry for detecting receipt of the signals from the clock domains and setting an update signal when all of the signals received from the clock domains have a common state; and gating circuitry for receiving the update signal and operable, when the update signal is set, to allow a next signal in the sequence to be received at the input of the first circuitry.

According to a second aspect of the present invention there is provided a method for controlling the transfer of a signal sequence in a first clock domain to a plurality of other clock domains, the method comprising: receiving in the first clock domain a signal from the sequence; outputting the signal in dependence on a first clock signal to the other clock domains, the signal having a first state, and in response thereto; transmitting in each of the other clock domains a signal representing the first state in dependence on their respective clock signals; detecting receipt of the signals from the clock domains; setting an update signal when all of the signals received from the clock domains have a common state; and receiving the update signal and operable, when the update signal is set, to allow a next signal in the sequence to be received in the first clock domain.

According to yet a further aspect of the present invention there is provided an integrated circuit for controlling the transfer of a signal sequence in a first clock domain to a plurality of other clock domains, the first clock domain comprising first circuitry having an input for receiving a signal from the sequence and an output for outputting the signal in dependence on a first clock signal to the other clock domains, the signal at the output of the first circuitry having a first state, and wherein each of the other clock domains comprise circuitry for transmitting a signal representing the first state in dependence on their respective clock signals, the integrated circuit comprising: detecting circuitry for detecting receipt of the signals from the clock domains and setting an update signal when all of the signals received from the clock domains have a common state; and gating circuitry for receiving the update signal and operable, when the update signal is set, to allow a next signal in the sequence to be received at the input of the first circuitry.

According to yet a further aspect of the present invention there is provided a set top box for controlling the transfer of a signal sequence in a first clock domain to a plurality of other clock domains, the first clock domain comprising first circuitry having an input for receiving a signal from the sequence and an output for outputting the signal in dependence on a first clock signal to the other clock domains, the signal at the output of the first circuitry having a first state, and wherein each of the other clock domains comprise circuitry for transmitting a signal representing the first state in dependence on their respective clock signals, the set top box comprising: detecting circuitry for detecting receipt of the signals from the clock domains and setting an update signal when all of the signals received from the clock domains have a common state; and gating circuitry for receiving the update signal and operable, when the update signal is set, to allow a next signal in the sequence to be received at the input of the first circuitry.

According to yet a further aspect of the present invention there is provided a digital video disk unit for controlling the transfer of a signal sequence in a first clock domain to a plurality of other clock domains, the first clock domain comprising first circuitry having an input for receiving a signal from the sequence and an output for outputting the signal in dependence on a first clock signal to the other clock domains, the signal at the output of the first circuitry having a first state, and wherein each of the other clock domains comprise circuitry for transmitting a signal representing the first state in dependence on their respective clock signals, the digital video disk unit comprising: detecting circuitry for detecting receipt of the signals from the clock domains and setting an update signal when all of the signals received from the clock domains have a common state; and gating circuitry for receiving the update signal and operable, when the update signal is set, to allow a next signal in the sequence to be received at the input of the first circuitry.

According to yet a further aspect of the present invention there is provided a decoding terminal for controlling the transfer of a signal sequence in a first clock domain to a plurality of other clock domains, the first clock domain comprising first circuitry having an input for receiving a signal from the sequence and an output for outputting the signal in dependence on a first clock signal to the other clock domains, the signal at the output of the first circuitry having a first state, and wherein each of the other clock domains comprise circuitry for transmitting a signal representing the first state in dependence on their respective clock signals, the decoding terminal comprising: detecting circuitry for detecting receipt of the signals from the clock domains and setting an update signal when all of the signals received from the clock domains have a common state; and gating circuitry for receiving the update signal and operable, when the update signal is set, to allow a next signal in the sequence to be received at the input of the first circuitry.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE INVENTION

For a better understanding of the present invention and to show how the same may be carried into effect, reference will now be made by way of example to the accompanying drawings in which like reference numerals represent like parts, in which:

FIG. 4 shows a circuit according to an embodiment of the present invention for improving metastability; and FIG. 5 shows a logical truth table.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged system for controlling the transfer of a signal sequence.

Figure 1:
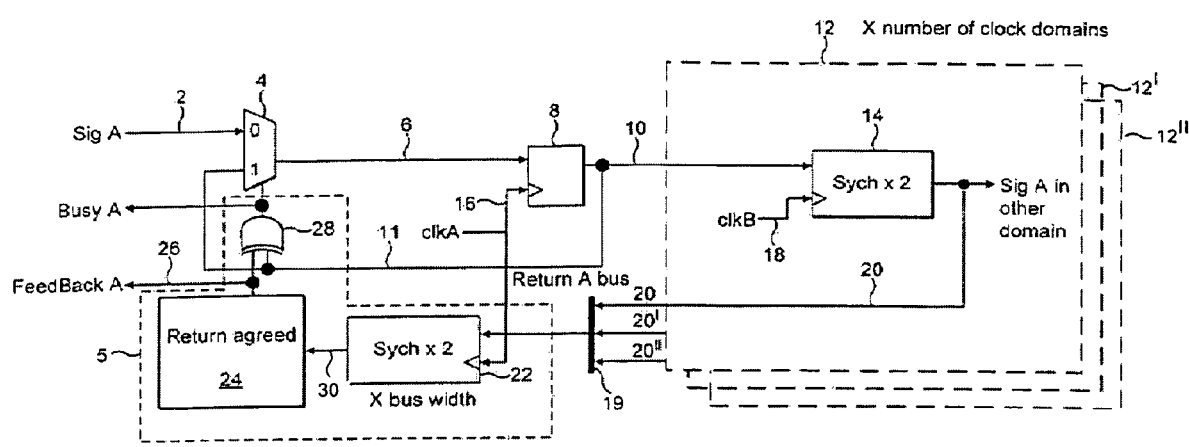
FIG. 1 shows a circuit according to an embodiment of the present invention.

FIG. 1 shows the circuitry of an embodiment of the present invention, and its context relating to a signal 2 which is controlled so that it is transferred between a first clocking domain and a plurality of other clock domains. In more detail, the first clock domain is the part of the integrated circuit whose circuit elements are clocked according to a first clock signal clkA 16. Therefore, the circuit elements 8, 22 and 24 for example reside in the first clock domain.

The signal sequence 2 can be thought of as comprising a plurality of successive signals. For example, in its most basic form the signal sequence could comprise a bit stream having a succession of bits. The signal sequence 2 is input to a multiplexer 4, which is controlled by selection circuitry 5 for determining when the next signal in the sequence should be allowed to pass through the multiplexer 4 to the input 6 of a first circuit 8. The first circuit 8 is located in the first domain since it is clocked by the first clock signal 16, which determines the clocking rate at which the signal on the input 6 is clocked by the first circuit 8 onto the output 10.

The signal clocked through the first circuit 8 in dependence on the first clock signal 16, is then simultaneously transferred to a plurality of different clock domains, 12, 12', 12". That is, a second clock domain 12 is shown as comprising circuitry 14 having an input which receives the signal output from the first circuit 8, and wherein circuit 14 is clocked by a second clock signal clkB 18, and has an output 20 which transmits the signal input to the circuit 14 at a rate depending on the second clock signal 18.

FIG. 1 also shows a plurality of other clock domains 12' and 12", which also comprise their own circuitry (similar to circuit 14 but not shown) and which have their own output signals that are dependent on their own respective clock signals. It should be appreciated that all of the clock signals in the respective clock domains are asynchronous.

The signals 20, 20', 20" are returned from the clock domains to a return bus 19 and sent through a synchronisation circuit 22 to comparison circuitry 24.

At this point it is useful to describe the circuitry 14 shown in clock domain 12, which in a preferred embodiment also exists in the other clock domains 12' and 12". FIG. 4 shows in more detail the circuitry 14, which comprises at least two flip-flops connected in series. That is, circuitry 14 comprises a first flip-flop 100 connected to receive the input 10 (which is the output from the first circuit 8) and the output of the first flip-flop is passed to the input of a second flip-flop 102. The output of the second flip-flop 102 is the output 20 of the return signal. The flip-flops are connected in series and are clocked by a common clock, which in the clock domain 12 will be clkB 18. The purpose of such a structural configuration of the circuitry 14 is to improve the so-called metastability within each of the clock domains.

The concept of metastability can be understood by considering a register in which the input value changes asynchronously with respect to the clock. If the input value changes significantly before the clock edge, then the register will store the new value. However, if the input value changes significantly after the clock edge, then the register will use the old input value. Broadly speaking, metastability is concerned with the situation when the register input changes just as the clock edge arrives, in which case it is difficult to decide whether the register should store the new value or the old value.

Consider, by analogy, a ball being dropped over a knife edge. If the ball is dropped to one side of the edge, it will fall cleanly and quickly to the other side of the knife. However if the ball is dropped onto the edge itself, the ball will balance on the edge for a while before falling to one side. The closer to the centre of the edge that the ball is dropped, the longer it will take to fall to one side. This is the same for flip-flops in which if the value changes too close to the clock edge, then the flip-flop can take a long time for the output to become stable.

The problems associated with metastability are reduced using statistical probability. That is, in FIG. 4 the probability that the input value will change close enough to the clock edge to cause a metastability condition is a finite value which can be determined based on the period of the particular clock signal in the physical parameters of the circuitry involved. However, by inserting a second flip-flop 102, the probability that a metastable condition in the first flip-flop 100 is still undecided by the time the clock edge arrives at the second flip-flop 102 is also known, since it is a function of the flip-flop itself and of the period.

By increasing the number of flip-flops in the series, the probability that a metastable condition results is reduced. For example, for a circuit having two flip-flops connected in series as shown in FIG. 4 it could be calculated that the probability value of a metastable condition occurring is $10^{-9}$. If a third flip-flop is added, the value becomes $10^{-18}$ and thus the chance of a metastability condition arising is even further reduced.

In practice however, a designer of a digital electronic circuit will consider the frequencies of the respective clock signals in the clock domains for the circuit which he is designing. For example, an embodiment of the present invention provides particularly advantageous applications in the field of set top boxes for television and video signals, wherein the clock frequencies are less than 100 MHz. It is therefore deemed appropriate for a metastability circuit having two flip-flops connected in series to be sufficient for clock signals having frequencies less than 100 MHz.

Figure 2:
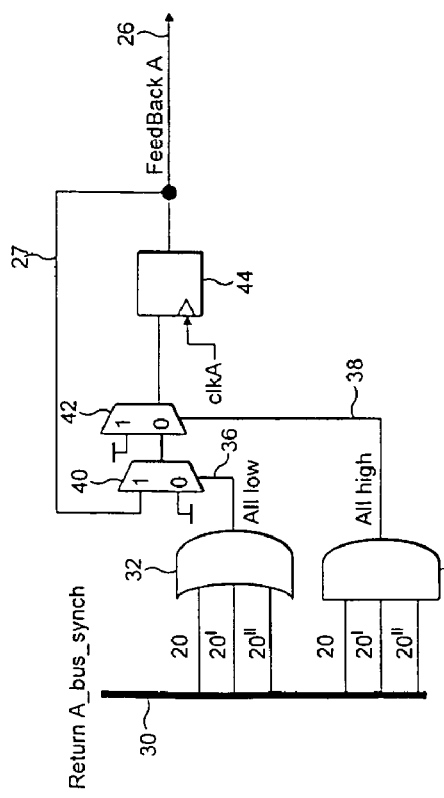
FIG. 2 shows circuitry for comparing the returned signals from the plurality of clock domains according to an embodiment of the present invention.

FIG. 1 shows that circuit 22 receives the return signals 20, 20' and 20" from the respective clock domains, and wherein the circuit 22 also comprises a metastability circuit having two flip-flops as shown in FIG. 4, but which is now clocked by the first clock signal clkA 16. These return signals are thus clocked through circuit 22 by the first clock signal 16 and form part of a return synchronisation bus 30. The return synchronisation bus 30 is used by comparison circuitry 24, the structure of which is shown in FIG. 2 according to a first embodiment. That is, an OR gate 32 and an AND gate circuitry 34 are connected to the return bus 30. Both the OR gate 32 and the AND gate 34 are capable of receiving the signals returned from each of the clock domains. That is OR gate 32 is capable of receiving the returned outputs 20, 20' and 20" from the respective circuitry in each of the corresponding clock domains. Likewise, AND gate 34 is capable of receiving each of the output signals 20, 20' and 20".

The output 36 of the OR gate 32 is used to control a second multiplexer 40, whereas the output 38 from the AND gate 34 is used to control a third multiplexer 42. The third multiplexer having one input connected to a high signal, for example a high voltage, and having a second input connected to receive the output from the second multiplexer 40. The output of the third multiplexer 42 is an input of a latch circuit 44, which is clocked by the first clock signal clkA 16. The output of the latch 44 is known as the feedbackA signal 26, which on one hand is coupled to the input of a XOR gate 28, and on the other hand is fed back to a first input 27 of the second multiplexer 40. The second input of the second multiplexer 40 is connected to a low signal, for example a low voltage.

The operation of FIG. 2 in relation to FIG. 1 will now be described as follows. Consider, for example, the signal sequence 2 comprising a bit stream wherein the first bit of the bit stream has a state "0" which is transferred to the input 6 of the first circuit 8 and clocked to the output 10 in dependence on the first clock signal 16. At this point in time the state of the signal on the output 10 will be a "0". This signal is then simultaneously transferred to each of the respective clock domains 12, 12' and 12", and it is a function of the detection circuitry 5 (shown in FIG. 1) to control the multiplexer 4 only to allow the next bit in the signal sequence to progress to the input of the first circuit 8, once all the outputs from the other clock domains have settled.

That is, for the first bit of the bit stream, the state "0" is transmitted to the other clock domains 12, 12' and 12", each being clocked with asynchronous clocking signals, which results in their corresponding return signals 20 changing to state "0" at different times. These return signals are then passed to synchronisation circuitry 22 which is clocked by the first clock signal onto a return synchronisation bus 30 shown in FIG. 2. The OR gate 32 and the AND gate 34 continually monitors the state of the corresponding return signals on the bus 30, and when all of the return signals 20, 20' and 20" all have the state "0", then a "0" is produced at output 36 and also a "0" is produced at the output 38 of the AND gate 34.

Since the output signal 36 is at "0", the second multiplexer 40 will select the second input (which is pulled low) and therefore a "0" will appear at the second input of the third multiplexer 42. Since the output signal 38 from the AND gate 34 is also at "0" the third multiplexer 42 will select the second input of the third multiplexer 42 and thus a "0" will propagate through the third multiplexer 42 to the input of the latch circuitry 44 and will be clocked out by the first clock 16.

Therefore the state of the signal 26 from the comparison circuitry 24 is received at a first input of the XOR gate 28 and at this point in time will be at a "0" (as expected). The XOR gate 28 is connected to receive a second input from the output 10 of the first circuit 8. The XOR gate then compares the states of the first and second input and provides an update signal to the control the multiplexer circuitry 4. The update signal is set/reset depending, for example, on the logic functionality shown in FIG. 5.

For the example, at this point in time both of the inputs to XOR gate 28 are "0" and therefore the output of the XOR gate will also produce a "0" which will control the multiplexer 4 so that the next bit in the bit stream is allowed to pass through the multiplexer 4 onto the input 6 of the first circuit 8.

To summarise, the circuit shown in FIG. 2 allows the states of the signals returned from the various clock domains to be monitored until such time as they are all the same (i.e. synchronised), at which time the multiplexer circuitry 4 is controlled to allow the next signal in the signal sequence 2 to be transferred to the first circuit 8. In this manner, the efficiency of the integrated circuit as a whole is optimised, since the next signal in the sequence is updated as soon as the outputs from the other clock domains are synchronised.

Furthermore, consider the case if the next bit in the bit stream 2 has the state "1", which will propagate through first circuit 8 and arrive at the output 10 after being clocked through the first circuit by the first clock signal 16. At this point the new signal is simultaneously transmitted to all of the other clock domains and the process is repeated, wherein the return bus 30 is monitored until such time as all of the return signals 20, 20' and 20" have settled to a state of "1". At this time, the output 36 of the OR gate 32 will be "1" as will the output 38 of the AND gate 34. Since the output 38 of the AND gate 34 is "1", the multiplexer 42 will select its first output which is pulled high and therefore a "1" will arrive at the input of the latch circuit 44 which is clocked by the first clock signal 16 to the output 26. The output 26 of the comparison circuitry 24 will be a "1" which is one input of the XOR gate 28 and the second input to the XOR gate derives from the output 10 of the first circuit 8 (which will also be at a state of "1"). If both of the inputs of the XOR gate 28 have a state of "1" then the output from the XOR gate 28 will be a "0" which indicates that the next bit in the bit stream 2 can be passed through the multiplexer 4 to the input 6 of the first circuit 8.

It is also useful to briefly describe the operation of the circuit of FIG. 2 in the case when not all of the outputs returned from the clock domains 12, 12' and 12" have settled. For example, if the signal output from the clock domain 20' has not yet settled at the predetermined state (i.e. "1" for the case of the second bit in the bit stream 2), then at this time the output 36 from the OR gate 32 will be a "1", but the output 38 from the AND gate 34 will be a "0". In such a case the third multiplexer 42 will be controlled such that it accepts its second input, which is the output from the second multiplexer 40 since the output 36 will be a one. Then the second multiplexer 40 accepts the currently fed back signal 27, which will be a "0" (i.e. the first bit in the bit stream 2). Thus a value of "0" will be propagated through the latch circuit 44 and will be output 26 to the XOR gate 28. At this point the inputs to the XOR gate will be respectively a "0" (from the output signal 26) and a "1" (from the state of the second bit in the bit stream). From FIG. 5, it can be seen that an XOR gate having inputs of "0" and "1" respectively will have an output of "1", in which case the multiplexer 4 does not allow the next bit in the bit stream to be transferred from the input 6 of the first circuit 8, and instead merely feeds back the current state of the second bit, i.e. "1". In this manner, it is ensured that the next bit in the bit stream 2 (i.e. the third bit) is only transferred at such a time when the output signal 20" returned from the clock domain 12" has settled at the same state as that of the signal at the output 10 of the first circuit 8.

Figure 3:
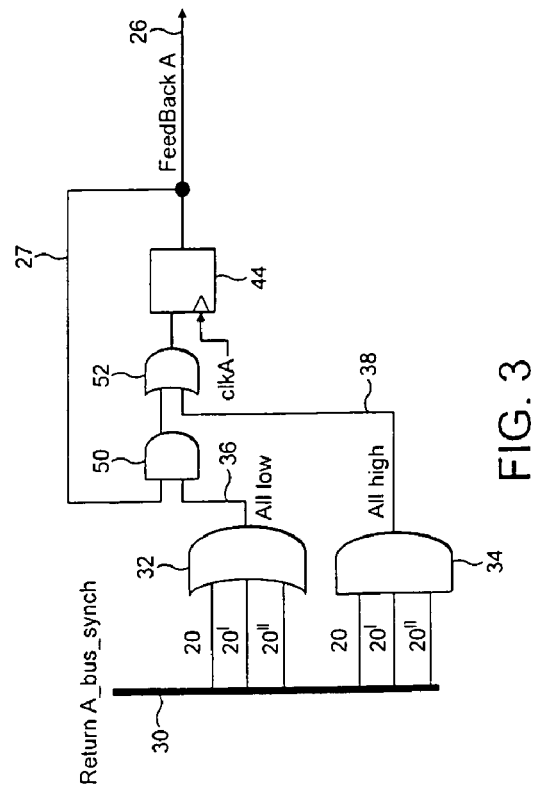
FIG. 3 shows a circuit for comparing the returned signals from the plurality of clock domains according to an alternative embodiment of the present invention.

FIG. 3 shows an alternative embodiment of the comparison circuitry 24, wherein the second and third multiplexers 40, 42 are now replaced with an AND gate 50 and an OR gate 52 respectively. If one considers the same sequence of bits as described in relation to FIG. 2, then the first bit is at state "0" and is propagated through the first circuit 8 to the output 10, and simultaneously transferred to all of the other clock domains 12, 12' and 12". The comparison circuitry 24 monitors the synchronisation bus 30 until such time as all of the inputs are low (i.e. "0"), wherein the output from the OR gate 32 and the AND gate 34 will be at "0".

The output from the OR gate 32 forms a first input to the AND gate 50, whereas the output 38 of the AND gate 34 forms a first input to the OR gate 52. A second input of the OR gate 52 is formed from the output of the AND gate 50. The output of the OR gate 52 forms an input to the latch circuitry 44 which is clocked by the first clock signal 16, and the output of the latch circuitry 44 forms, on one hand an output signal 26 to produce a first input to XOR gate 28, and on the other hand is fed back to form a second input 27 of the AND gate 50.

Thus when all the signals returned from the clock domains 12, 12' and 12" have settled to a state "0", then at this time most of the outputs 36 and 38 from the OR gate 32 and AND gate 34 respectively will also be at a state "0". Thus the output of the AND gate 50 will be "0" and the output of OR gate 52 will therefore also be "0". This value is then propagated through the latch circuit 44 to form the output signal 26. The XOR gate 28 will then have the state of "0" for both its first and second inputs and thus also outputs a value of "0" which enables the multiplexer 4 to transfer the next bit in the bit stream 2.

The next bit is a "1" which is propagated to an output 10 of the first circuit 8 and is then simultaneously transferred to all of the clock domains 12, 12', 12". The comparison circuitry 24 then monitors the synchronisation bus 30 until the signals returned from all of the respective clock domains have a state of "1". At this time both of the outputs 36 and 38 have a state of "1". Since the first input of the AND gate will be fed back from the output of the latch circuit 44 (which will be the state of the first bit in the bit stream, i.e. "0"), then the output of the AND gate 50 will be "0".

Since the output 38 from the AND gate 34 is a "1", and even though the output from the AND gate 50 is a "0", the output of the OR gate 52 will be a "1". This state, i.e. "1", will be propagated through the latch circuit 44 to the output 26. At this point both of the inputs to the XOR gate will be at a state "1", and therefore the output of the XOR gate will be a "0" which results in the next bit in the bit stream being transferred to the input 6 of the first circuit 8.

It should be appreciated that the sequence of signals 2, need not necessarily be a bit stream and could in fact be a plurality of messages in which case the circuitry the comparison circuitry determines when the messages received from the plurality of other domains meet a predetermined state at the output of the first circuit.

It should also be appreciated that the signal sequence 2 is often a control signal. Thus control signals are returned and allowed to settle (in the various domains) before any further control signals in the sequence are sent.

It should be appreciated that the circuitry of the present application is particularly advantageous over software implementations, since the control of the signal to be transferred to a plurality of domains is inherent in the circuitry and therefore does not need to be taken into account using any software algorithms.

Embodiments of the present invention can find application in different types of electronic circuits, for example counters, clock recovery circuits, etc. Example of multi-clock environments include digital media circuits, which for example may have different video, audio, picture domains. Embodiments of the present application find particularly useful application in integrated circuits (IC's), set top boxes (STB's) and digital video disk (DVD) units. It is intended that the present invention encompass such changes and modifications as fall within the scope of the appended claims.

What is claimed is:

1. An electronic circuit in a first clock domain, the electronic circuit capable of:
    receiving a signal sequence;
    outputting a first signal from the signal sequence to a plurality of other clock domains in dependence upon a clock signal of the first clock domain;
    receiving from each of the plurality of other clock domains an output of the first signal in dependence upon a clock signal of the other clock domain;
    outputting a next signal from the signal sequence in dependence upon the clock signal of the first clock domain, wherein the next signal is output upon detecting that all of the plurality of other clock domains have output the first signal; wherein detecting that all of the plurality of other clock domains have output the first signal by:
    generating an update signal when all of the plurality of other clock domains have output the first signal; and
    gating the next signal from the signal sequence to be output in dependence upon the update signal; and further wherein the electronic circuit is further capable of synchronizing at least one of the outputs received from the plurality of other domains with the clock signal of the first domain using a circuit capable of reducing metastability in the synchronized output.

2. The electronic circuit of claim 1, wherein the signal sequence is one of: a sequence of bits, a sequence of messages, and a sequence of control signals.

3. The electronic circuit of claim 1, wherein at least one of the outputs received from the plurality of other domains is received from a circuit capable of reducing metastability in the output.

4. An electronic circuit in a first clock domain, the electronic circuit capable of:
    receiving a signal sequence;
    outputting a first signal from the signal sequence to a plurality of other clock domains in dependence upon a clock signal of the first clock domain;
    receiving from each of the plurality of other clock domains an output of the first signal in dependence upon a clock signal of the other clock domain; and
    outputting a next signal from the signal sequence in dependence upon the clock signal of the first clock domain, wherein the next signal is output upon detecting that all of the plurality of other clock domains have output the first signal, wherein the electronic circuit is further capable of detecting that all of the plurality of other clock domains have output the first signal by:
    generating an update signal when all of the plurality of other clock domains have output the first signal; and
    gating the next signal from the signal sequence to be output in dependence upon the update signal, and
    wherein the electronic circuit is further capable of generating an update signal when all of the plurality of other clock domains have output the first signal by:
    generating a first signal indicating that the outputs of all of the plurality of other clock domains have a common first logic level;
    generating a second signal indicating that the outputs of all of the plurality of other clock domains have a common second logic level;
    wherein the electronic circuit is further capable of generating an update signal when all of the plurality of other clock domains have output the first signal by:
    generating a first signal corresponding to a common logic level for the outputs of all of the plurality of other clock domains; and
    generating the update signal by combining the first signal with the first state,
    wherein the first signal remains at a previous common logic lever of the outputs of all of the plurality of other clock domains until the outputs of all of the plurality of other clock domains have a new common logic level.

5. An electronic circuit in a first clock domain, the electronic circuit capable of:
    receiving a signal sequence;
    outputting a first signal from the signal sequence to a plurality of other clock domains in dependence upon a clock signal of the first clock domain;
    receiving from each of the plurality of other clock domains an output of the first signal in dependence upon a clock signal of the other clock domain; and
    outputting a next signal from the signal sequence in dependence upon the clock signal of the first clock domain, wherein the next signal is output upon detecting that all of the plurality of other clock domains have output the first signal, wherein the electronic circuit is further capable of detecting that all of the plurality of other clock domains have output the first signal by:
    generating an update signal when all of the plurality of other clock domains have output the first signal; and
    gating the next signal from the signal sequence to be output in dependence upon the update signal, and
    wherein the electronic circuit is further capable of generating an update signal when all of the plurality of other clock domains have output the first signal by:
    generating a first signal corresponding to a common logic level of the outputs of all of the plurality of other clock domains; and
    generating the update signal by combining the first signal with the first state,
    wherein the first signal remains at a previous common logic level of the outputs of all of the plurality of other clock domains until the outputs of all of the plurality of other clock domains have a new common logic level.

6. An apparatus comprising:
    a source of a signal sequence; and
    an integrated circuit including an electronic circuit in a first clock domain, the electronic circuit capable of:
    receiving a signal sequence;
    outputting a first signal from the signal sequence to a plurality of other clock domains in dependence upon a clock signal of the first clock domain;
    receiving from each of the plurality of other clock domains an output of the first signal in dependence upon a clock signal of the other clock domain;
    outputting a next signal from the signal sequence in dependence upon the clock signal of the first clock domain, wherein the next signal is output upon detecting that all of the plurality of other clock domains have output the first signal; wherein detecting that all of the plurality of other clock domains have output the first signal by:
    generating an update signal when all of the plurality of other clock domains have output the first signal; and
    gating the next signal from the signal sequence to be output in dependence upon the update signal; and further wherein the electronic circuit is further capable of synchronizing at least one of the outputs received from the plurality of other domains with the clock signal of the first domain using a circuit capable of reducing metastability in the synchronized output.

7. The apparatus of claim 6, wherein the signal sequence is one of: a sequence of bits, a sequence of messages, and a sequence of control signals.

8. The apparatus of claim 6, wherein at least one of the outputs received from the plurality of other domains is received from a circuit capable of reducing metastability in the output.

9. An apparatus comprising:
a source of a signal sequence; and
an integrated circuit including an electronic circuit in a first clock domain, the electronic circuit capable of:
receiving a signal sequence;
outputting a first signal from the signal sequence to a plurality of other clock domains in dependence upon a clock signal of the first clock domain;
receiving from each of the plurality of other clock domains an output of the first signal in dependence upon a clock signal of the other clock domain; and
outputting a next signal from the signal sequence in dependence upon the clock signal of the first clock domain, wherein the next signal is output upon detecting that all of the plurality of other clock domains have output the first signal,
wherein the electronic circuit is further capable of detecting that all of the plurality of other clock domains have output the first signal by:
generating an update signal when all of the plurality of other clock domains have output the first signal; and
gating the next signal from the signal sequence to be output in dependence upon the update signal, and
wherein the electronic circuit is further capable of generating an update signal when all of the plurality of other clock domains have output the first signal by:
generating a first signal indicating that the outputs of all of the plurality of other clock domains have a common first logic level;
generating a second signal indicating that the outputs of all of the plurality of other clock domains have a common second logic level;
combining the first signal with a current logic level of the update signal to generate a third signal;
combining the second signal with the third signal to generate a fourth signal; and
outputting the fourth signal as the update signal in dependence upon the clock signal of the first domain.

10. An apparatus comprising:
a source of a signal sequence; and
an integrated circuit including an electronic circuit in a first clock domain, the electronic circuit capable of:
receiving a signal sequence;
outputting a first signal from the signal sequence to a plurality of other clock domains in dependence upon a clock signal of the first clock domain;
receiving from each of the plurality of other clock domains an output of the first signal in dependence upon a clock signal of the other clock domain; and
outputting a next signal from the signal sequence in dependence upon the clock signal of the first clock domain, wherein the next signal is output upon detecting that all of the plurality of other clock domains have output the first signal,
wherein the electronic circuit is further capable of detecting that all of the plurality of other clock domains have output the first signal by:
generating an update signal when all of the plurality of other clock domains have output the first signal; and
gating the next signal from the signal sequence to be output in dependence upon the update signal, and
wherein the electronic circuit is further capable of generating an update signal when all of the plurality of other clock domains have output the first signal by:
generating a first signal corresponding to a common logic level of the outputs of all of the plurality of other clock domains; and
generating the update signal by combining the first signal with the first state,
wherein the first signal remains at a previous common logic level of the outputs of all of the plurality of other clock domains until the outputs of all of the plurality of other clock domains have a new common logic level.

11. A method, comprising:
receiving a signal sequence in an electronic circuit in a first clock domain;
outputting a first signal from the signal sequence to a plurality of other clock domains in dependence upon a clock signal of the first clock domain;
receiving from each of the plurality of other clock domains an output of the first signal in dependence upon a clock signal of the other clock domain;
outputting a next signal from the signal sequence in dependence upon the clock signal of the first clock domain, wherein the next signal is output upon detecting that all of the plurality of other clock domains have output the first signal; wherein detecting that all of the plurality of other clock domains have output the first signal further comprises: generating an update signal when all of the plurality of other clock domains have output the first signal; and gating the next signal from the signal sequence to be output in dependence upon the update signal; and further wherein synchronizing at least one of the outputs received from the plurality of other domains with the clock signal of the first domain; and reducing metastability in the synchronized output.

12. The method of claim 11, further comprising reducing metastability in at least one of the outputs received from the plurality of other domains.

13. A method, comprising:
receiving a signal sequence in an electronic circuit in a first clock domain;
outputting a first signal from the signal sequence to a plurality of other clock domains in dependence upon a clock signal of the first clock domain;
receiving from each of the plurality of other clock domains an output of the first signal in dependence upon a clock signal of the other clock domain; and
outputting a next signal from the signal sequence in dependence upon the clock signal of the first clock domain, wherein the next signal is output upon detecting that all of the plurality of other clock domains have output the first signal, wherein detecting that all of the plurality of other clock domains have output the first signal further comprises:
generating an update signal when all of the plurality of other clock domains have output the first signal; and
gating the next signal from the signal sequence to be output in dependence upon the update signal, and wherein generating an update signal when all of the plurality of other clock domains have output the first signal further comprises:
  generating a first signal indicating that the outputs of all of the plurality of other clock domains have a common first logic level;
  generating a second signal indicating that the outputs of all of the plurality of other clock domains have a common second logic level;
  combining the first signal with a current logic level of the update signal to generate a third signal;
  combining the second signal with the third signal to generate a fourth signal; and
  outputting the fourth signal as the update signal in dependence upon the clock signal of the first domain.

14. A method, comprising:
  receiving a signal sequence in an electronic circuit in a first clock domain;
  outputting a first signal from the signal sequence to a plurality of other clock domains in dependence upon a clock signal of the first clock domain;
  receiving from each of the plurality of other clock domains an output of the first signal in dependence upon a clock signal of the other clock domain; and
  outputting a next signal from the signal sequence in dependence upon the clock signal of the first clock domain, wherein the next signal is output upon detecting that all of the plurality of other clock domains have output the first signal, wherein detecting that all of the plurality of other clock domains have output the first signal further comprises:
    generating an update signal when all of the plurality of other clock domains have output the first signal; and
    gating the next signal from the signal sequence to be output in dependence upon the update signal, and
  wherein generating an update signal when all of the plurality of other clock domains have output the first signal further comprises:
    generating a first signal corresponding to a common logic level of the outputs of all of the plurality of other clock domains; and
    generating the update signal by combining the first signal with the first state,
  wherein the first signal remains at a previous common logic level of the outputs of all of the plurality of other clock domains until the outputs of all of the plurality of other clock domains have a new common logic level.

15. The apparatus of claim 6, wherein the apparatus is an integrated circuit.

16. The apparatus of claim 6, wherein the apparatus is a set top box.

17. The apparatus of claim 6, wherein the apparatus is a digital video disk unit.

18. The apparatus of claim 6, wherein the apparatus is a decoding terminal.

19. An electronic circuit in a first clock domain, comprising:
  first circuitry connected to receive a signal sequence at an input and transmit, at an output, a first signal from the signal sequence to a plurality of other clock domains in dependence upon a clock signal of the first clock domain;
  detection circuitry connected to receive a signal output from each of the plurality of other clock domains and to set an update signal when all of the signal outputs from the plurality of other clock domains have a common state; and
  gating circuitry connected to permit a next signal in the signal sequence to be transmit only when the update signal is set; and wherein the electronic circuit is further capable of synchronizing at least one of the outputs received from the plurality of other domains with the clock signal of the first domain using a circuit capable of reducing metastability in the synchronized output.

20. An apparatus, comprising:
  means for receiving a signal sequence in an electronic circuit in a first clock domain;
  means for outputting a first signal from the signal sequence to a plurality of other clock domains in dependence upon a clock signal of the first clock domain;
  means for receiving from each of the plurality of other clock domains an output of the first signal in dependence upon a clock signal of the other clock domain; and
  wherein next signal is the signal sequence is output upon detecting that all of the plurality of other clock domains have output the first signal; and wherein the electronic circuit is further capable of synchronizing at least one of the outputs received from the plurality of other domains with the clock signal of the first domain using a circuit capable of reducing metastability in the synchronized output.

* * * * *